US006892241B2

(12) United States Patent
Kouznetsov et al.

(10) Patent No.: US 6,892,241 B2
(45) Date of Patent: *May 10, 2005

(54) ANTI-VIRUS POLICY ENFORCEMENT SYSTEM AND METHOD

(75) Inventors: Victor Kouznetsov, Aloha, OR (US); Ricky Huang, Tigard, OR (US)

(73) Assignee: Networks Associates Technology, Inc., Santa Clara, CA (US)

( * ) Notice: Subject to any disclaimer, the term of this patent is extended or adjusted under 35 U.S.C. 154(b) by 695 days.

This patent is subject to a terminal disclaimer.

(21) Appl. No.: 09/968,106

(22) Filed: Sep. 28, 2001

(65) Prior Publication Data

US 2003/0065793 A1 Apr. 3, 2003

(Under 37 CFR 1.47)

(51) Int. Cl.[7] .............................................. G06F 15/16
(52) U.S. Cl. ...................... 709/229; 709/203; 709/238; 713/200; 713/201
(58) Field of Search ................................ 709/203, 238, 709/229, 227, 225; 713/201, 200; 705/400; 707/200; 380/23; 340/5, 8

(56) References Cited

U.S. PATENT DOCUMENTS

| 5,550,976 | A | | 8/1996 | Henderson et al. .... 395/200.06 |
| 5,832,208 | A | | 11/1998 | Chen et al. ............ 395/187.01 |
| 5,937,160 | A | * | 8/1999 | Davis et al. ................. 709/203 |
| 6,075,863 | A | | 6/2000 | Krishnan et al. .............. 380/49 |
| 6,088,803 | A | * | 7/2000 | Tso et al. ..................... 713/201 |
| 6,119,165 | A | * | 9/2000 | Li et al. ....................... 709/229 |
| 6,205,551 | B1 | | 3/2001 | Grosse ........................ 713/201 |
| 6,266,704 | B1 | * | 7/2001 | Reed et al. .................. 709/238 |
| 6,269,447 | B1 | | 7/2001 | Maloney et al. ............ 713/201 |
| 6,327,579 | B1 | * | 12/2001 | Crawford .................... 705/400 |
| 6,622,150 | B1 | * | 9/2003 | Kouznetsov et al. ........ 707/200 |
| 6,718,469 | B2 | * | 4/2004 | Pak et al. .................... 713/200 |
| 6,725,377 | B1 | * | 4/2004 | Kouznetsov ................ 713/201 |

FOREIGN PATENT DOCUMENTS

| JP | 07281980 A | 10/1995 | ........... G06F/13/00 |
| WO | 09/05814 | 2/1999 | ............ H04K/1/00 |

OTHER PUBLICATIONS

Jansen et al, Applying Mobile Agents to Intrusion Detection and Response; www.itl.nist.gov/div893/staff/mell/maresponse.pdf.*
Gordon, Real World Anti–Virus Product Reviews and Evaluations (1996); csrc.nist.gov/nissc/1996/papers/NISSC96/final.PDF.*
Using Mobile Agent Results to Create Hard–To–Detect Computer Viruses—Wang; www.cs.uwm.edu/~wang/papers/virus.ps.gz.*
Java and Internet Security—Viljamaa, Viljamaa (1998); www.cs.helsinki.fi/group/fred/reports/JavaSecurityReport-Final.ps.gz.*
"Sonic WALL Network Anti–Virus: The Problem".
"Sonic WALL Network Anti–Virus: The Solution".
"Sonic WALL Network Anti–Virus Benefits".
"Sonic WALL Network Anti–Virus–Details".

* cited by examiner

Primary Examiner—Thong Vu
(74) Attorney, Agent, or Firm—Zilka-Kotab, PC; Christopher J. Hamaty (57) ABSTRACT

A system, method and computer program product are provided for enforcing an anti-virus policy. Initially, a status command is received at a client computer from a network device utilizing a network. In response to the status command, a status is sent to the network device utilizing the network. Such status relates to anti-virus scanning software on the client computer. Next, a response is initiated at the client computer utilizing the network based on the status.

42 Claims, 5 Drawing Sheets

ANTI-VIRUS POLICY ENFORCEMENT SYSTEM AND METHOD

FIELD OF THE INVENTION

The present invention relates to anti-virus scanners, and more particularly to ensuring that anti-virus scanners operate properly to prevent malicious code attacks.

BACKGROUND OF THE INVENTION

Network security management is becoming a more difficult problem as networks grow in size and become a more integral part of organizational operations. Attacks on networks are growing both due to the intellectual challenge such attacks represent for hackers and due to the increasing payoff for the serious attacker. Furthermore, the attacks are growing beyond the current capability of security management tools to identify and quickly respond to those attacks. As various attack methods are tried and ultimately repulsed, the attackers will attempt new approaches with more subtle attack features. Thus, maintaining network security is on-going, ever changing, and an increasingly complex problem.

Computer network attacks can take many forms and any one attack may include many security events of different types. Security events are anomalous network conditions each of which may cause an anti-security effect to a computer network. Security events include stealing confidential or private information; producing network damage through mechanisms such as viruses, worms, or Trojan horses; overwhelming the network's capability in order to cause denial of service, and so forth.

Security systems often employ security risk-assessment tools, i.e. "scanners," to search for known types of security events in the form of malicious programs such as viruses, worms, and Trojan horses. Still yet, scanners are used for content filtering to enforce an organization's operational policies [i.e. detecting harassing or pornographic content, junk e-mails, misinformation (virus hoaxes), etc.].

Unfortunately, such scanners are often susceptible to tampering, deactivation, removal, etc., especially when the scanners are installed on a client computer readily accessible by a user. Often, such user may intentionally disable a scanner to increase the speed of his or her computer, or may unintentionally remove the software during the normal course of use of the computer. In still other scenarios, some users do not take the time to update the scanners with the latest virus signatures that are currently available.

These situations often result in a client computer that is highly susceptible to a virus attack or the like, especially when access is gained to an unsecured network such as the Internet. There is thus a need for a more effective method of enforcing anti-virus policies.

DISCLOSURE OF THE INVENTION

A system, method and computer program product are provided for enforcing an anti-virus policy. Initially, a status command is received at a client computer from a network device utilizing a network. In response to the status command, a status is sent to the network device utilizing the network. Such status relates to anti-virus scanning software on the client computer. Next, a response is initiated at the client computer utilizing the network based on the status.

In one embodiment, the status command may be received in response to an attempt to access the network by the client computer. Further, the status command may be received on a predetermined port and/or utilizing user datagram protocol (UDP).

In another embodiment, the network device may include a firewall. In such embodiment, it may be determined whether the status command is received from the firewall. As such, the status may be conditionally sent based on the determination as to whether the status command is received from the firewall.

In still another embodiment, the status command may be encrypted. Such command may be decrypted upon receipt. Moreover, the status may be encrypted prior to sending it over the network.

In one embodiment, the status may relate to a version of the anti-virus scanning software. Further, the status may relate to any tampering of the anti-virus scanning software. Still yet, the status may relate to any removal of the anti-virus scanning software. Even still, the status may relate to any deactivation of the anti-virus scanning software. Various exemplary responses to such statuses will now be set forth.

For example, the response may include conditionally preventing access to the network by the client computer based on the status. Further, such access to the network may be prevented until an action is carried out.

As an option, the response may conditionally include a notice to the user of the client computer based on the status. Such notice may indicate that the user is required to reinstall the anti-virus scanning software. Further, the notice may indicate that the user is required to reactivate the anti-virus scanning software.

Moreover, the response may include requiring an action at the client computer. For example, the response may conditionally require a reinstallation of the anti-virus scanning software based on the status. Similarly, the response may conditionally require a reactivation of the anti-virus scanning software based on the status.

The response may also conditionally include an update command received from the network device based on the status. Such update command may optionally be encrypted. In use, the update command may be received if the status indicates that the anti-virus scanning software on the client computer requires an update.

In one aspect of the present embodiment, the anti-virus scanning software may be updated in response to the update command. More particularly, the anti-virus scanning software may be updated utilizing the network. Optionally, the updating of the anti-virus scanning software may include sending an update request to a server utilizing the network, and receiving an update from the server. Such update may include a plurality of virus signatures in the form of a plurality of .DAT files or the like.

In yet another embodiment, various measures may be taken to prevent denial of service (DoS) attacks. In particular, an amount of time that elapsed between the receipt of the status command and a previous receipt of the status command may be determined. Further, the status may be conditionally sent in response to the status command based on the amount of time that has elapsed. In particular, such status may be sent in response to the status command only if the amount of time that has elapsed is greater than a predetermined amount.

In order to provide a more automated environment, the status may be automatically sent to the network device in response to the status command. Further, the anti-virus scanning software may be automatically updated in response to the update command.

As an option, the various operations of the present embodiment may be carried out for a plurality of client computers communicating with the network device. Such client computers may communicate with the network device via a local area network (LAN).

DESCRIPTION OF THE PREFERRED EMBODIMENTS

Figure 1:
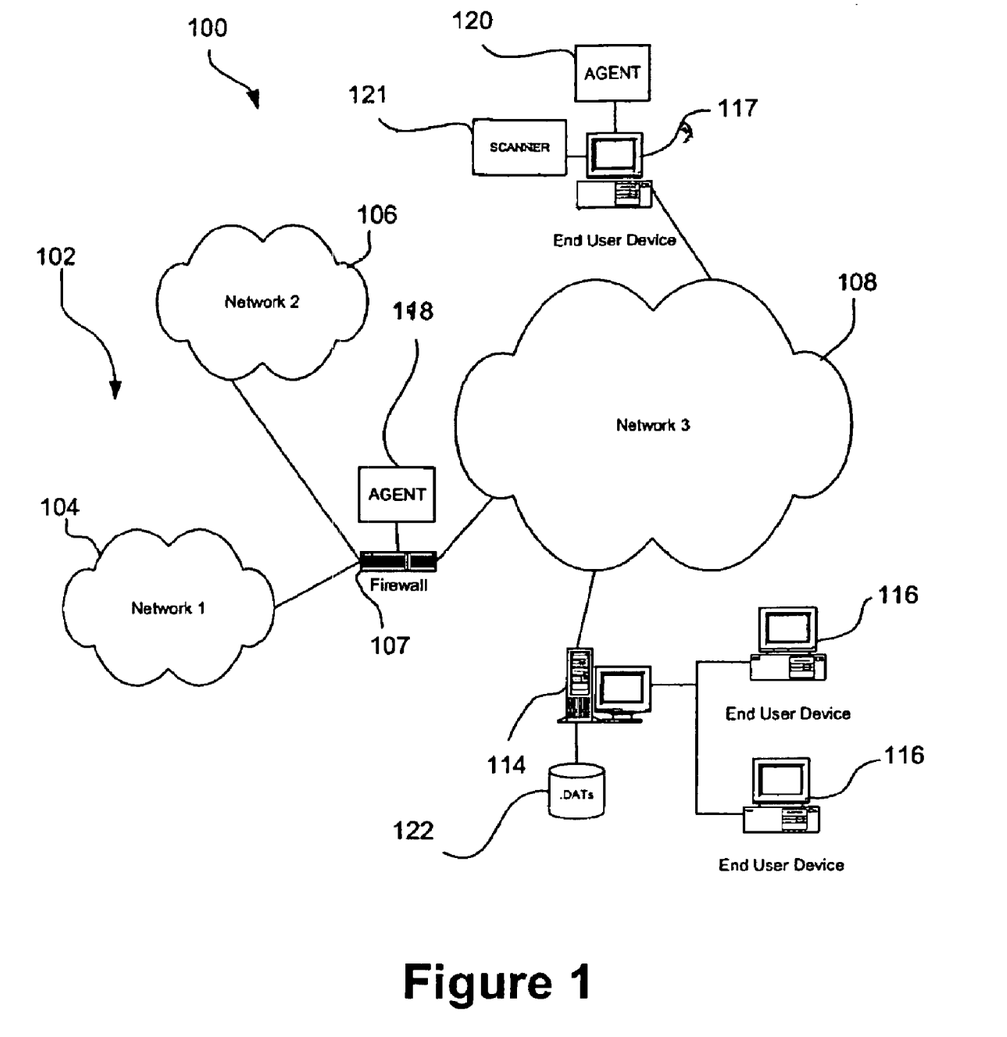
FIG. 1 illustrates a network architecture, in accordance with one embodiment.

FIG. 1 illustrates a network architecture 100, in accordance with one embodiment. As shown, a plurality of networks 102 are provided including a first network 104 and a second network 106. Also included is at least one firewall 107 coupled between the networks 102 and a third network 108. In the context of the present network architecture 100, the networks 104, 106, 108 may each take any form including, but not limited to a local area network (LAN), a wide area network (WAN) such as the Internet, etc. Further, any number of networks may be included.

Further included is at least one server 114 coupled to the third network 108, and which is accessible from the networks 102 via the firewall 107. It should be noted that the server(s) 114 may include any type of computing device/ groupware. Coupled to each server 114 is a plurality of client computers 116. Such client computers 116 may include a desktop computer, lap-top computer, hand-held computer, printer or any other type of logic. It should be noted that a client computer 117 may also be directly coupled to any of the networks, in one embodiment.

In use, the firewall 107 serves as an entrance point from the networks 102 to the third network 108. Further, the firewall 107 may serve as an entrance from one of the networks 102 and one of the client computers 116, 117 and/or server(s) 114. Of course, the firewall 107 may be configured to serve as an entrance point to any client computer, network, and/or sub-network.

Further provided are software agents including a firewall agent 118 coupled to and situated behind the firewall 107, and a client agent 120 coupled to one of the client computers 117. In various other embodiments, the client agent 120 may be associated with a server 114 which is in turn coupled to client computers for administrative purposes. In such a scenario, such server 114 may be referred to as a "client computer." Further, the agent 118 may be coupled to any other type of intermediary network device coupled to the client computers 117.

The client computers 117 may also be equipped with a scanner 121 including anti-virus scanning software. Such scanner 121 may be equipped to probe for network weaknesses by simulating certain types of security events that make up an attack. Such scanner 121 may also test user passwords for suitability and security. Moreover, the scanner 121 may also search for known types of security events in the form of malicious programs such as viruses, worms, and Trojan horses. Still yet, the scanner 121 may be adapted for content filtering to enforce an organization's operational policies [i.e. detecting harassing or pornographic content, junk e-mails, misinformation (virus hoaxes), etc.]. Of course, the scanner 121 may take any other sort of security measures such as e-mail attachment filtering, etc.

Also provided is a database 122 that is coupled to an associated server (i.e. server 114). Such database 122 is equipped with virus signature updates that may be selectively distributed to the client computers 117 for updating the scanner 121.

As will soon become apparent, the software agents serve to enforce an anti-virus policy on the client computers 117 or any other related device. This is accomplished by monitoring a status of the scanner 121 at the client computers 117, and initiating a response if the scanner 121 at the client computer 117 is insufficient for one reason or another. The manner in which this is accomplished will be set forth hereinafter in greater detail during reference to FIGS. 3–5.

Figure 2:
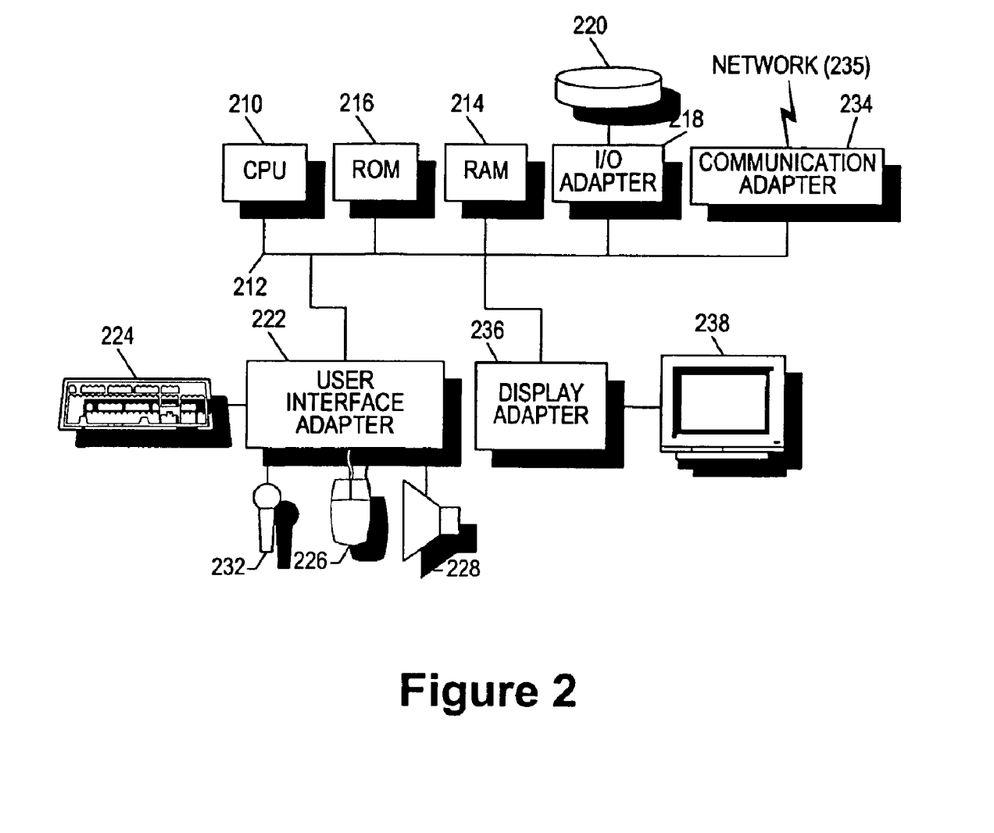
FIG. 2 shows a representative hardware environment that may be associated with the data servers and/or client computers of FIG. 1, in accordance with one embodiment.

FIG. 2 shows a representative hardware environment that may be associated with the data servers 114 and/or client computers 116, 117 of FIG. 1, in accordance with one embodiment. Such figure illustrates a typical hardware configuration in accordance with a preferred embodiment having a central processing unit 210, such as a microprocessor, and a number of other units interconnected via a system bus 212.

The present hardware shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the present hardware to a communication network 235 (e.g., a data processing network) and a display adapter 236 for connecting the bus 212 to a display device 238. It should be noted that the present hardware is set forth for illustrative purposes only, and should not be construed as limiting in any manner.

The present hardware may have resident thereon an operating system such as the Microsoft Windows NT or Windows/95 Operating System (OS), the IBM OS/2 operating system, the MAC OS, or UNIX operating system. It will be appreciated that a preferred embodiment may also be implemented on platforms and operating systems other than those mentioned. A preferred embodiment may be written using JAVA, C, and/or C++ language, or other programming languages, along with an object oriented programming methodology. Object oriented programming (OOP) has become increasingly used to develop complex applications.

Figure 3:
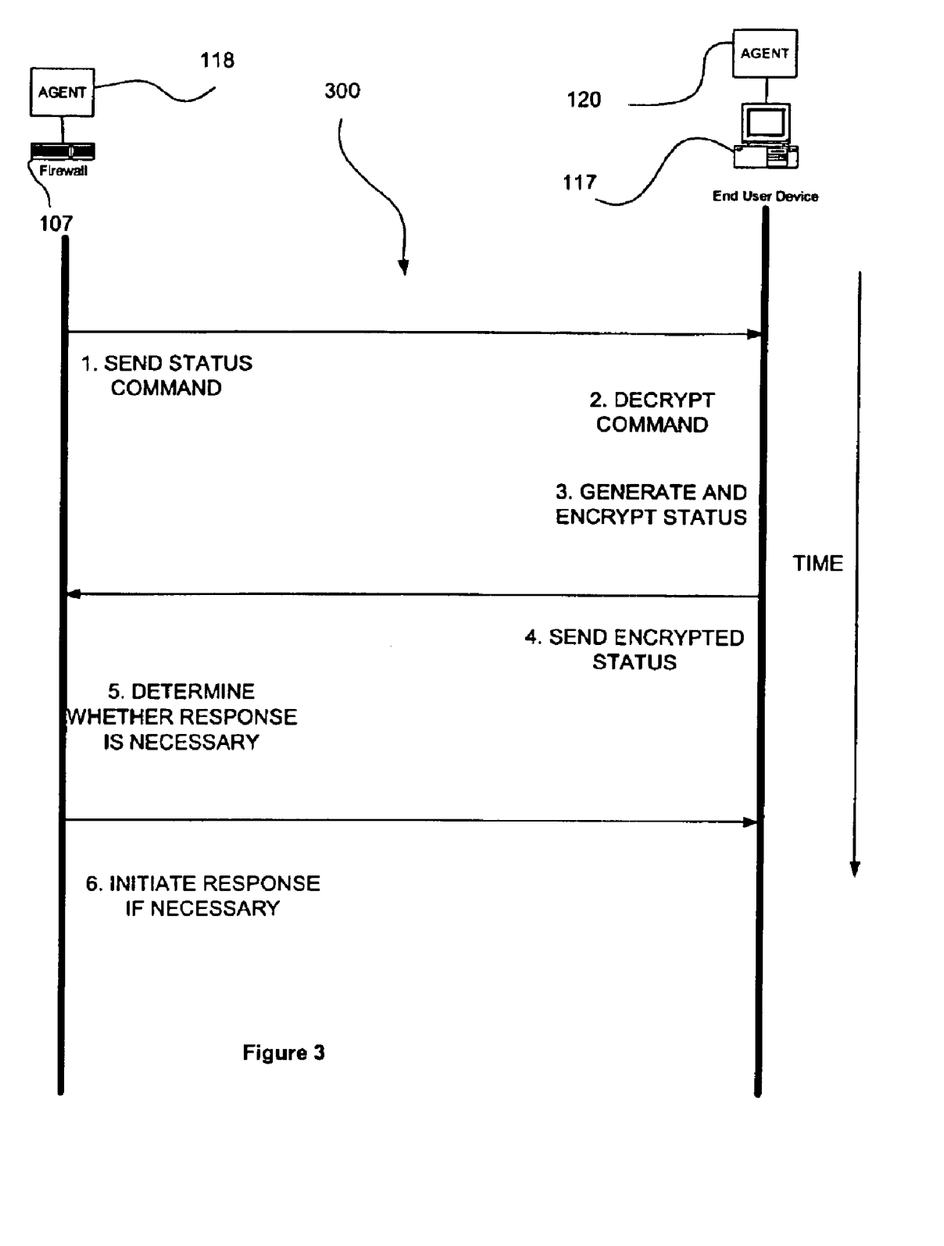
FIG. 3 illustrates a flow diagram illustrating the various communications between the firewall agent and the client agent of FIG. 1 for enforcing an anti-virus policy, in accordance with one embodiment.

FIG. 3 illustrates a flow diagram 300 illustrating the various communications between the firewall agent 118 and the client agent 120 for enforcing an anti-virus policy at the client computer 117, in accordance with one embodiment. Initially, in operation 1, a status command is received by the client agent 120 of the client computer 117 from a network device such as the firewall 107 utilizing a network.

As an option, such status command may be encrypted. In such case, the status command may be decrypted at the client computer 117. Note operation 2.

In response to the status command, a status is generated and sent to the network device utilizing the network. See operation 3–4. Optionally, such status may be encrypted. The status relates to the anti-virus scanner 121 on the client computer 117, or any other factor relating to the security of the client computer 117.

In one embodiment, the status may relate to a version of the anti-virus scanning software. Further, the status may relate to any tampering of the anti-virus scanning software. Still yet, the status may relate to any removal of the anti-virus scanning software. Even still, the status may relate to any deactivation of the anti-virus scanning software.

Next, in operation 5, it is determined whether the status is sufficient for protecting the client computer 117 from an attack. Based on this determination, a response is initiated at the client computer 117 utilizing the network if it is necessary. See operation 6.

In one embodiment, the response may include conditionally preventing access to a network such as the Internet by the client computer 117. Such access to the network may be prevented until an appropriate security action is carried out.

As an option, the response may conditionally include a notice to the user of the client computer based on the status. Such notice may indicate that the user is required to reinstall the anti-virus scanning software. Further, the notice may indicate that the user is required to reactivate the anti-virus scanning software.

Moreover, the response may require an action at the client computer 117. For example, the response may conditionally require a reinstallation of the anti-virus scanning software based on the status. Similarly, the update may conditionally require a reactivation of the anti-virus scanning software based on the status.

The response may also conditionally include an update command received from the network device based on the status. Such update command may optionally be encrypted. In use, the update command may be received if the status indicates that the anti-virus scanning software on the client computer requires an update. More information on such embodiment will now be set forth during reference to FIGS. 4–5.

Figure 4:
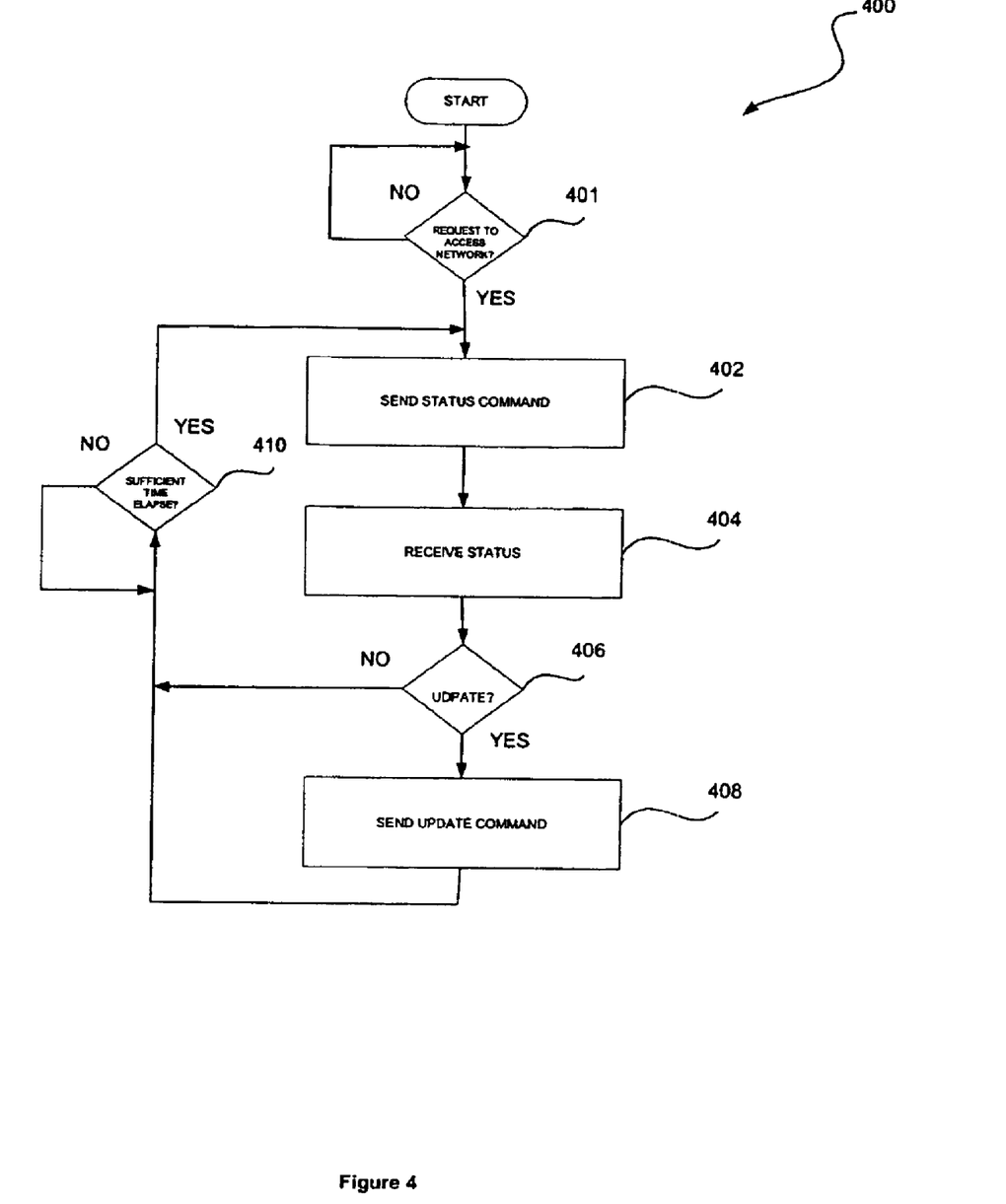
FIG. 4 is a more detailed flow diagram showing the various operations carried out by the firewall agent of FIG. 3.

FIG. 4 is a more detailed flow diagram showing the various operations carried out by the firewall agent 118 of FIG. 3. As shown, it is first determined whether the client computer 117 is attempting to access a network such as the Internet. Note decision 401. Of course, any other triggering situation may be monitored which may make the client computer 117 subject to an attack.

Once triggered, in operation 402, the firewall agent 118 sends a status command to the client agent 120 at the client computer 117 requesting a status of the scanner 121 thereof. In response thereto, a status may be received from the client computer 117 in operation 404.

It may then be determined in decision 406 as to whether an update to the scanner 121 is necessary. In one embodiment, the status of the scanner 121 may include a version number. Moreover, the update may be deemed necessary if the version number is below a predetermined acceptable number.

If it is necessary, in operation 408, an update command may be sent for initiating an update process on the client computer 117. In any case, the present method 400 is stalled until it is determined at decision 410 that sufficient time has elapsed for reinitiating the process. More information will now be set forth regarding the manner in which the agent 120 on the client computer 117 operates.

Figure 5:
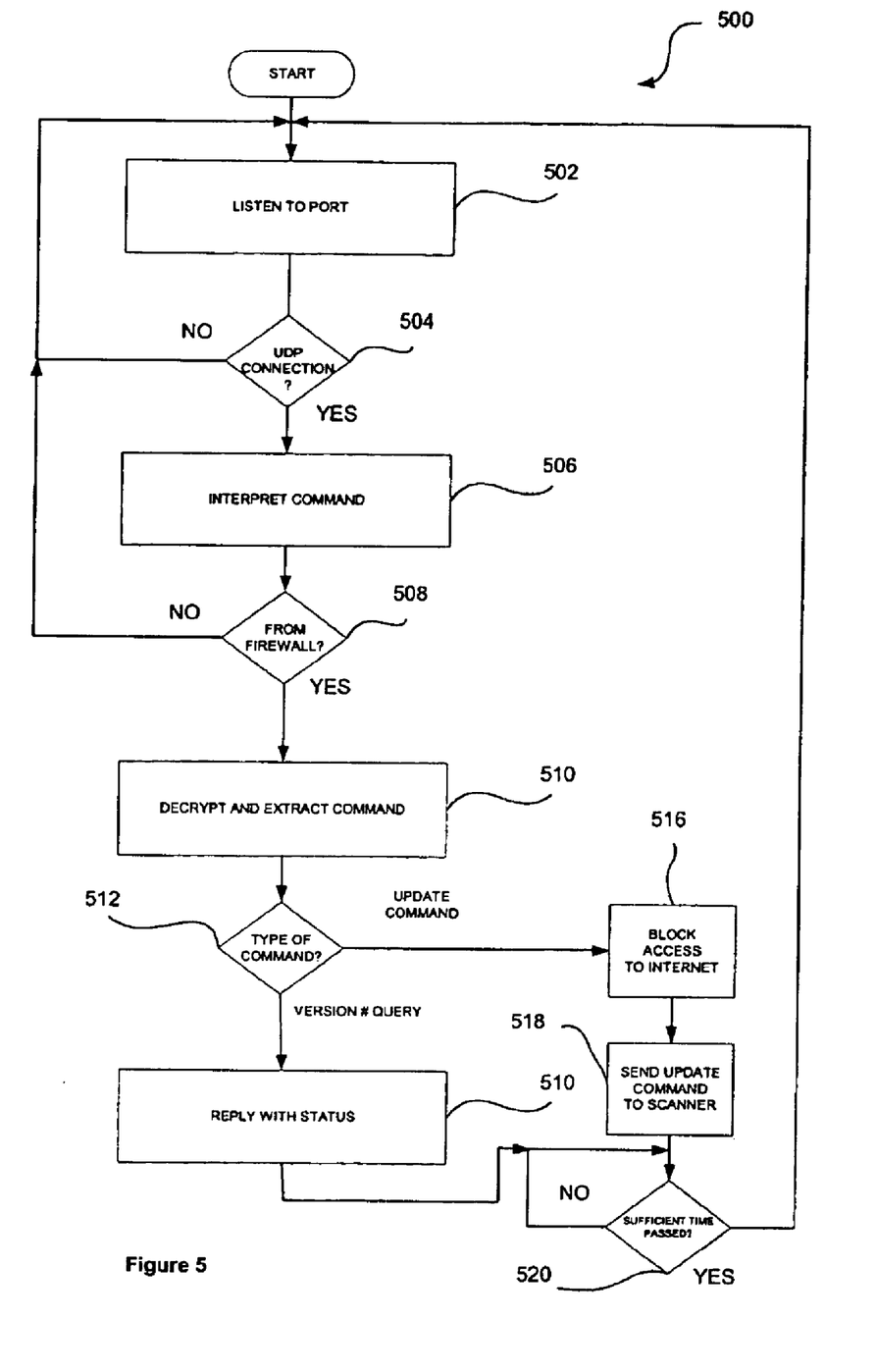
FIG. 5 illustrates a method carried out by the client agent in order to enforce an anti-virus policy.

FIG. 5 illustrates a method 500 carried out by the client computer 117 in order to enforce an anti-virus policy. While the method 500 may be carried out by the agent 120 on the client computer 117, it should be noted that similar functionality may be applied in any desired environment. Initially, a predetermined port is monitored in operation 502. Such port 502 may be preselected for receiving commands from the firewall agent 118 at the firewall 107.

As communications are received on the predetermined port, it is determined in decision 504 as to whether any of such communications is received utilizing user datagram protocol (UDP). If so, such command is interpreted in operation 506. Such interpretation may include a parsing of the command to determine a source thereof, as well as any other desired parameters.

Once interpreted, it is determined whether the command was received from the firewall 107. See decision 508. If so, the command is decrypted and extracted for identification purposes in operation 510. As mentioned earlier, the commands are encrypted prior to being sent from the firewall agent 118. It should be noted that an encryption key may be based on a shared secret concatenated with the IP address of the client computer 117.

The type of command may then be discerned in decision 512. As an option, the difference between the status command and the update command may simply be one (1) bit of information. If the command is a status command as set forth in operation 402 of FIG. 4, the status of the scanner 121 may be sent in operation 510. Such status may include a version number, a license number, operating system information, and/or a timestamp of the last update. In order to provide a more automated environment, the status may be automatically sent to the network device in response to the status command.

If, however, the command is an update command, access to the network that was originally requested may be blocked for security reasons. Note operation 516. Again, this may be accomplished automatically in order to provide a more automated environment.

Thereafter, a separate update command may be sent to the scanner 121 for initiating a scanner update process involving the database 122. Note operation 518. In response thereto, the anti-virus scanning software is automatically updated in response to the update command. Specifically, the updating of the anti-virus scanning software may include sending an update request to the server 114 utilizing the network, and receiving an update from the server 114. Such update may include a plurality of virus signatures in the form of a plurality of .DAT files or the like. For more information regarding such update process, reference may be made to U.S. Pat. No. 6,035,423 and U.S. Pat. No. 6,269,456, which are each incorporated herein by reference.

As an option, various measures may be taken to prevent denial of service (DoS) attacks. In particular, an amount of time that elapsed between the receipt of the command and a previous receipt of the command may be determined in decision 520. Further, the method 500 may only be repeated if the amount of elapsed time is greater than a predetermined amount (i.e. 10 seconds).

As an option, the various operations of the present embodiment may be carried out for a plurality of client computers communicating with the network device. Such client computers may communicate with the network device via a local area network (LAN).

While various embodiments have been described above, it should be understood that they have been presented by way of example only, and not limitation. For example, any of the network components may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A method for enforcing an anti-virus policy, comprising:
   (a) receiving a status command at a client computer from a network device utilizing a network;
   (b) sending a status to the network device utilizing the network in response to the status command, the status rolating to anti-virus scanning software on the client computer; and
   (c) initiating a response at the client computer utilizing the network based on the status; wherein the response includes conditionally preventing access to the network by the client computer based on the status of the anti-virus scanning software, the status including at least one of a version of the anti-virus scanning software and any deactivation of the anti-virus scanning software.

2. The method as recited in claim 1, wherein the status command is received in response to an attempt to access the network by the client computer.

3. The method as recited in claim 1, wherein the status command is received on a predetermined port.

4. The method as recited in claim 1, wherein the status command is received utilizing user datagram protocol (UDP).

5. The method as recited in claim 1, wherein the network device includes a firewall.

6. The method as recited in claim 5, and further comprising determining whether the status command is received from the firewall.

7. The method as recited in claim 6, wherein the status is conditionally sent based on the determination as to whether the status command is received from the firewall.

8. The method as recited in claim 1, wherein the status command is encrypted, and further comprising decrypting the status command.

9. The method as recited in claim 8, and further comprising encrypting the status prior to sending the status utilizing the network.

10. The method as recited in claim 1, wherein the response includes requiring an action at the client computer.

11. The method as recited in claim 10, and further comprising preventing access to the network until the action is carried out.

12. The method as recited in claim 1, wherein the response conditionally includes a notice to the user of the client computer based on the status.

13. The method as recited in claim 12, wherein the notice indicates that the user is required to reinstall the anti-virus scanning software.

14. The method as recited in claim 12, wherein the notice indicates that the user is required to reactivate the anti-virus scanning software.

15. The method as recited in claim 1, wherein the response conditionally requires a reinstallation of the anti-virus scanning software based on the status.

16. The method as recited in claim 1, wherein the response conditionally requires a reactivation of the anti-virus scanning software based on the status.

17. The method as recited in claim 1, wherein the response conditionally includes an update command received from the network device based on the status.

18. The method as recited in claim 17, wherein the update command is encrypted.

19. The method as recited in claim 17, wherein the update command is received if the status indicates that the anti-virus scanning software on the client computer requires an update.

20. The method as recited in claim 17, and further comprising updating the anti-virus scanning software in response to the update command.

21. The method as recited in claim 20, wherein the anti-virus scanning software is updated utilizing the network.

22. The method as recited in claim 21, wherein the updating of the anti-virus scanning software includes sending an update request to a server utilizing the network.

23. The method as recited in claim 22, wherein the updating of the anti-virus scanning software further include receiving an update from the server.

24. The method as recited in claim 23, wherein the update includes a plurality of virus signatures.

25. The method as recited in claim 23, wherein the update includes a plurality of DAT files.

26. The method as recited in claim 1, and further comprising determining an amount of time that elapsed between the receipt of the status command and a previous receipt of the status command.

27. The method as recited claim 26, and further comprising conditionally sending the status in response to the status command based on the amount of time that has elapsed.

28. The method as recited in claim 27, and further comprising sending the status in response to the status command if the amount of time that has elapsed is greater than a predetermined amount to prevent a denial of service attack (DOS).

29. The method as recited in claim 1, wherein the status is automatically sent to the network device in response to the status command.

30. The method as recited in claim 19, wherein the anti-virus scanning software is automatically updated in response to the update command.

31. The method as recited in claim 1, wherein the status relates to any tampering of the anti-virus scanning software.

32. The method as recited in claim 1, wherein the status relates to any removal of the anti-virus scanning software.

33. The method as recited in claim 1, wherein (a)–(c) are carried out for a plurality of client computers communicating with the network device.

34. The method as recited in claim 33, wherein the client computers communicate with the network device via a local area network (LAN).

35. A computer program product embodied on a computer readable medium for enforcing an anti-virus policy, comprising:
   (a) computer code for receiving a status command at a client computer from a network device utilizing a network;
   (b) computer code for sending a status to the network device utilizing the network in response to the status command, the status relating to anti-virus scanning software on the client computer; and
   (c) computer code for initiating a response at the client computer utilizing the network based on the status; wherein the response includes conditionally preventing access to the network by the client computer based on the status of the anti-virus scanning software, the status including at least one of a version of the anti-virus scanning software and any deactivation of the anti-virus scanning software.

36. A system for enforcing an anti-virus policy, comprising:
  (a) means for receiving a status command at a client computer from a network device utilizing a network;
  (b) means for sending a status to the network device utilizing the network in response to the status command, the status relating to anti-virus scanning software on the client computer; and
  (c) means for initiating a response at the client computer utilizing the network based on the status;
    wherein the response includes conditionally preventing access to the network by the client computer based on the status of the anti-virus scanning software, the status including at least one of a version of the anti-virus scanning software and any deactivation of the anti-virus scanning software.

37. A system for enforcing an anti-virus policy, comprising:
  (a) a client agent for receiving a status command at a client computer from a network device utilizing a network, and sending a status to the network device utilizing the network in response to the status command, the status relating to anti-virus scanning software on the client computer, and
  (b) wherein a response at the client computer is initiated utilizing the network by on the status;
    wherein the response includes conditionally preventing access to the network by the client computer based on the status of the anti-virus scanning software, the status including at least one of a version of the anti-virus scanning software and any deactivation of the anti-virus scanning software.

38. A method for enforcing an anti-virus policy, comprising:
  (a) attempting to gain access to a network via a firewall utilizing a client computer;
  (b) sending a status to the firewall utilizing the network, the status relating to anti-virus scanning software on the client computer, and
  (c) conditionally gaining access to the network via the firewall based on the status, the status including at least one of a version of the anti-virus scanning software and any deactivation of the anti-virus scanning software.

39. A method for enforcing an anti-virus policy, comprising:
  (a) attempting to gain access to a network via a firewall utilizing a client computer; and
  (b) identifying a status relating to anti-virus scanning software on the client computer,
  (c) wherein access is selectively allowed to the network via the firewall based on the status, the status including at least one of a version of the anti-virus scanning software and any deactivation of the anti-virus scanning software.

40. A computer program product embodied on a computer readable medium for enforcing an anti-virus policy, comprising:
  (a) computer code for attempting to gain access to a network via a firewall utilizing a client computer; and
  (b) computer code for identifying a status relating to anti-virus scanning software on the client computer;
  (c) wherein access is selectively allowed to the network via the firewall based on the status, the status including at least one of a version of the anti-virus scanning software and any deactivation of the anti-virus scanning software.

41. A method for enforcing an anti-virus policy, comprising;
  (a) monitoring a port on a client computer;
  (b) receiving a command at the client computer utilizing a network;
  (c) determining whether the command is received from a firewall; and
  (d) if it is determined that the command is received from the firewall:
    (i) decrypting the command,
    (ii) determining whether the command includes a status command or an update command.
    (iii) if the command includes a status command, sending a status to the firewall utilizing the network in response to the status command, the status relating to anti-virus scanning software on the client computer status including at least one of a version of the anti-virus scanning software and any deactivation of the anti-virus scanning software, wherein access is selectively allowed to the network via the firewall based on the status, and
    (iv) if the command includes an update command, updating the anti-virus scanning software utilizing the network in response to the update command.

42. A method for enforcing an anti-virus policy, comprising
  (a) receiving a status command at a client computer from a network device utilizing a network;
  (b) sending a status to the network device utilizing the network in response to the status command, the status relating to anti-virus scanning software on the client computer; and
  (c) initiating a response at the client computer utilizing the network based an the status;
    wherein the status command is received in response to an attempt to access the network by the client computer;
    wherein the status command is received on a predetermined port;
    wherein the status command is received utilizing user datagram protocol (UDP);
    wherein the network device includes a firewall;
    wherein it is determined whether the status command is received from the firewall, and the status is conditionally sent based on the determination as to whether the status command is received from the firewall;
    wherein the status command is encrypted, and further comprising decrypting the status command, and the status is encrypted prior to sending the status utilizing the network;
    wherein the response includes conditionally preventing access to the network by the client computer based on the status, requiring an action at the client computer, conditionally including a notice to the user of the client computer based on the status where the notice indicates that the user is required to at least one of reinstall the anti-virus scanning software and reactivate the anti-virus scanning software, conditionally requiring a reinstallation of the anti-virus scanning software based on the status, conditionally requiring a reactivation of the anti-virus scanning software based on the status, and conditionally including an update command received from the network device based on the status;
    wherein access to the network is prevented until the action is carried out;

wherein the update command is encrypted;

wherein the update command is received if the status indicates that the anti-virus scanning software on the client computer requires an update, and the anti-virus scanning software is updated in response to the update command;

wherein an amount of time that elapsed between the receipt of the status command and a previous receipt of the status command is determined, and the status is conditionally sent in response to the status command based on the amount of time that has elapsed;

wherein the status is sent in response to the status command if the amount of time that has elapsed is greater than a predetermined amount to prevent a denial of service attack (DOS);

wherein the status relates to aversion of the anti-virus scanning software, any tampering of the anti-virus scanning software, any removal of the anti-virus scanning software, and any deactivation of the anti-virus scanning software;

wherein (a)–(c) are carried out for a plurality of client computers communicating with the network device;

wherein the client computers communicate with the network device via a local area network (LAN).

* * * * *

UNITED STATES PATENT AND TRADEMARK OFFICE
CERTIFICATE OF CORRECTION

PATENT NO. : 6,892,241 B2  Page 1 of 1
APPLICATION NO. : 09/968106
DATED : May 10, 2005
INVENTOR(S) : Kouznetsov et al.

It is certified that error appears in the above-identified patent and that said Letters Patent is hereby corrected as shown below:

col. 7, line 15, replace "rolating" with --relating--;
col. 8, line 27, replace "recited" with --recited in--;
col. 9, line 24, replace "computer," with --computer;--;
col. 9, line 26, replace "by" with --based--;
col. 9, line 39, replace "computer," with --computer;--;
col. 9, line 49, replace "computer," with --computer;--;
col. 10, line 2, replace "comprising;" with --comprising:--;
col. 10, line 12, replace "command." with --command,--;
col. 10, line 16, replace "computer" with --computer, the--;
col. 10, line 26, replace "comprising" with --comprising:--;
col. 10, line 34, replace "an" with --on--;
col. 12, line 3, replace "aversion" with --a version--.

Signed and Sealed this

Thirtieth Day of November, 2010

David J. Kappos
*Director of the United States Patent and Trademark Office*